United States Patent
Beattie

(10) Patent No.: US 7,080,841 B2
(45) Date of Patent: Jul. 25, 2006

(54) HUB SEAL ADAPTER

(76) Inventor: James C. Beattie, 6747 Whitestone Rd., Baltimore, MD (US) 21207

( * ) Notice: Subject to any disclaimer, the term of this patent is extended or adjusted under 35 U.S.C. 154(b) by 0 days.

(21) Appl. No.: 10/430,377

(22) Filed: May 7, 2003

(65) Prior Publication Data

US 2004/0021369 A1 Feb. 5, 2004

Related U.S. Application Data

(60) Provisional application No. 60/377,988, filed on May 7, 2002.

(51) Int. Cl.
*F16J 15/32* (2006.01)
(52) U.S. Cl. ........................ 277/551; 277/572
(58) Field of Classification Search ........... 277/312, 277/602–603, 607, 609, 616, 625–626, 628, 277/630, 637, 639, 641, 642, 644, 647, 549, 277/551, 572–573, 910; 384/15, 159, 477, 384/489, 544, 607; 301/105.1, 108.1, 108.2
See application file for complete search history.

(56) References Cited

U.S. PATENT DOCUMENTS

| | | | |
|---|---|---|---|
| 3,467,395 A * | 9/1969 | Kan | 277/551 |
| 3,601,417 A * | 8/1971 | Szepesvary | 277/556 |
| 4,113,137 A * | 9/1978 | Wind | 277/644 |
| 4,226,426 A | 10/1980 | Messenger | |
| 4,303,103 A * | 12/1981 | Marks et al. | 277/607 |
| 4,327,922 A | 5/1982 | Walther | |
| 4,552,367 A | 11/1985 | Fedorovich et al. | |
| 4,664,392 A * | 5/1987 | Hatch | 277/551 |
| 4,817,964 A * | 4/1989 | Black, Jr. | 277/410 |
| 4,921,125 A * | 5/1990 | Scales | 277/628 |
| 5,201,528 A | 4/1993 | Upper | |
| 5,292,199 A * | 3/1994 | Hosbach et al. | 384/478 |
| 5,299,811 A * | 4/1994 | Kershaw | 277/551 |
| 5,553,870 A * | 9/1996 | Czekansky et al. | 277/559 |
| 6,155,573 A | 12/2000 | Simms | |
| 6,533,286 B1 * | 3/2003 | Eckel et al. | 277/551 |
| 6,692,008 B1 * | 2/2004 | Beck | 277/500 |
| 6,695,357 B1 * | 2/2004 | Schenk et al. | 277/608 |
| 6,702,295 B1 * | 3/2004 | Kapcoe et al. | 277/572 |
| 6,736,407 B1 * | 5/2004 | Tremoulet et al. | 277/638 |
| 2003/0094849 A1 * | 5/2003 | Joki et al. | 301/105.1 |
| 2004/0012199 A1 * | 1/2004 | Beach et al. | 285/272 |

\* cited by examiner

*Primary Examiner*—Jason R. Bellinger
(74) *Attorney, Agent, or Firm*—Timothy J. Klima

(57) ABSTRACT

A hub seal adapter has an outer diameter and thickness dimensioned to removably fit into the internal bore of a standard automotive hub in the same position that the grease seal would normally occupy, and be retained in the hub by the same snap ring as would be used to retain the seal in the hub. The adapter includes an internal bore into which a grease seal is press fit, the grease seal having a slightly smaller outside diameter than the standard seal. A snap ring retains the grease seal in the internal bore of the adapter. The adapter can be manually removed from the hub for cleaning and greasing of the hub bearings without damaging the seal, thereby allowing reuse of the seal.

108 Claims, 4 Drawing Sheets

HUB SEAL ADAPTER

This application claims priority to U.S. Provisional Patent Application No. 60/377,988 to James Beattie, entitled Racing Hub Seal Adapter and filed on May 7, 2002, the entirety of which is incorporated by reference herein.

FIELD OF THE INVENTION

The present invention relates to wheel hubs used on automobiles, and particularly, racing automobiles.

BACKGROUND OF THE INVENTION

Automobiles, and particularly stock car type racing automobiles, use Timken® style tapered roller bearings mounted in the wheel hubs. Grease seals are used in the hubs to retain lubricating grease in the bearing cavity and prevent such grease from escaping the wheel hub and fouling brake components, tires, the track, etc. The seals are usually press fitted into an internal bore in the hub and locked in place by an internal snap ring fitted in a groove in the internal bore of the hub. See FIG. 5 (Prior Art) which shows a standard hub 10 having an internal bore 12, flange 14 acting as a stop for grease seal 16, and an internal groove 18 for receiving snap ring 20 to retain grease seal 16 in the hub 10. In a typical example, the seal is 0.375" wide, with an OD of 3.5" and seals against a 2.375" seal surface on a 2" diameter spindle. The seal is typically a 0.005" press fit in the internal bore 12 of the hub 10.

Due to the extreme conditions under which these vehicles operate, the bearings are removed from the hub, cleaned and repacked with grease after every race. However, to do this, the seals must first be removed from the hubs to allow access to the bearings. Because the seals are press fitted into the hub, removal of the seals, by prying them out of the hub with a pry bar or other tool, usually damages the seals so that they can no longer be used. Thus, the four seals on the four hubs must be replaced after every race, even though they were still in good condition prior to being removed from the hubs. This results in additional expense for replacing several dozen seals over the course of a racing season that were rendered unusable only by virtue of having to remove them from the hub to grease the bearings.

In addition, the act of removing the seals with a pry bar is not precise and can result in gouging or otherwise damaging the hub, especially an aluminum or magnesium hub, potentially requiring replacement of the hub. Injury to the mechanic can also occur.

BRIEF SUMMARY

A racing hub seal adapter having an outer diameter and thickness is dimensioned to removably fit into the internal bore of a standard racing hub in the same position that the grease seal would normally occupy, and be retained in the hub by the same snap ring as would be used to retain the seal in the hub. The adapter includes an internal bore into which a grease seal is press fit, the grease seal having a slightly smaller outside diameter than the standard seal. A snap ring retains the grease seal in the internal bore of the adapter. An O-ring around the outer diameter of the adapter provides a seal between the adapter and the hub when the adapter is fitted into the hub.

To grease the bearings, the adapter is removed from the hub. Since it is not necessary to contact the seal when removing the adapter from the hub, the seal is not damaged during this process and can be reused several times until it reaches the end of its operating life. Although the o-ring around the outside of the adapter may be replaced occasionally, or even with each repacking, the o-ring is much less expensive than the grease seal, and there is still a significant cost savings over replacing the grease seals after every race.

It is an object of the invention to provide a hub seal adapter that allows removal of a grease seal from a hub for cleaning and greasing of bearings without damaging the grease seal.

It is a further object to be able to reuse the grease seal through several removal and reinstallation cycles.

The hub seal adapter is described in greater detail below in conjunction with the attached drawings.

DETAILED DESCRIPTION

Figure 1:
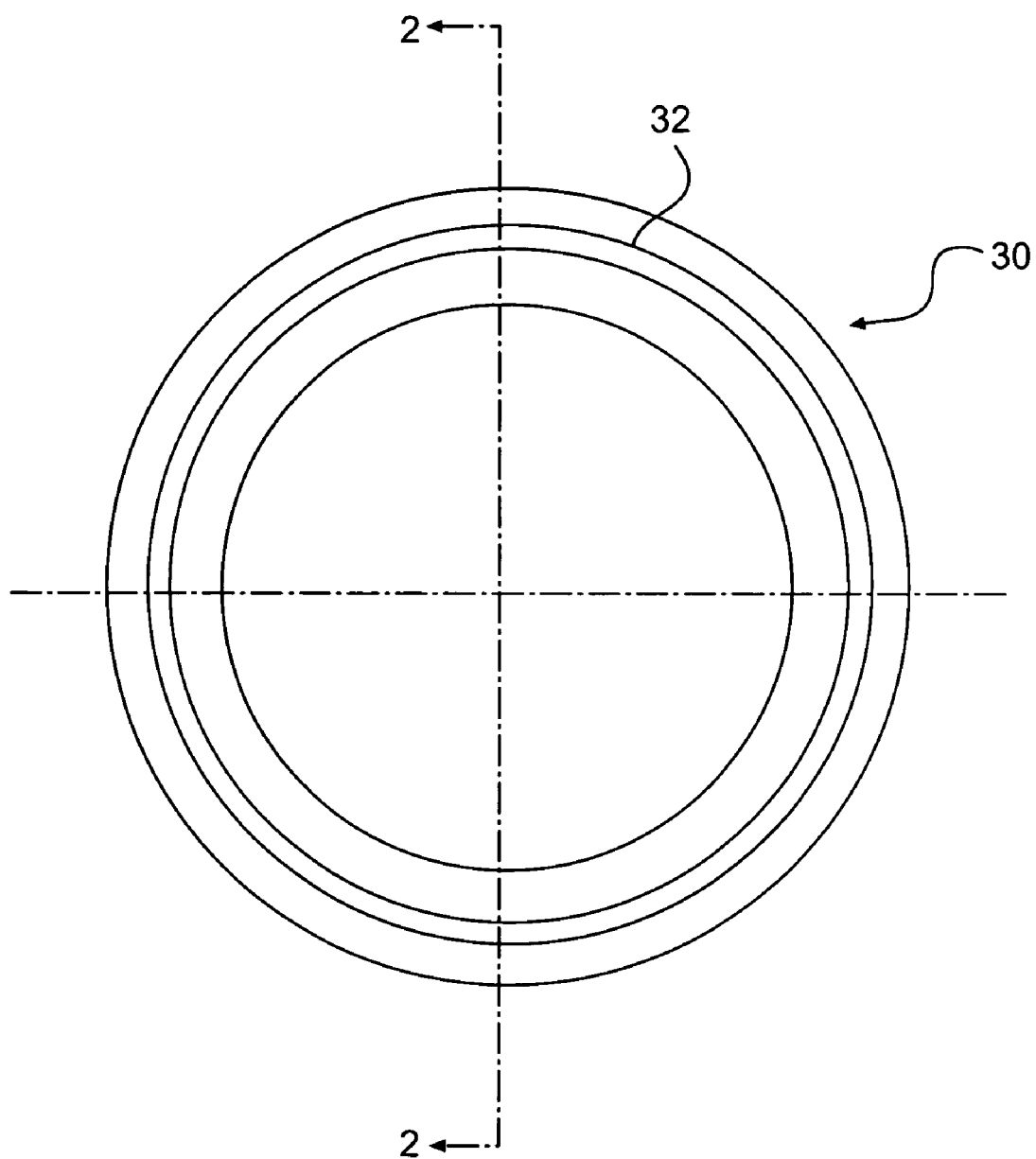
FIG. 1 is a front elevational view of a racing hub seal adapter.

The hub seal adapter 30 includes a main body 32 having a circumferential o-ring retaining groove 34 around an external periphery thereof, the groove 34 being bounded on both sides by walls 36. The outer diameter of the walls 36 is set to be slightly smaller than the diameter of the internal bore 12 of the hub 10. An o-ring 38 positioned in the groove 34 will compress when the adapter 30 is installed in the hub 10 and will center the adapter 30 with respect to the internal bore 12. Since the adapter 30 is not press fitted into the internal bore 12 of the hub 10, the adapter 30 can be removed from the hub 10 by hand once the snap ring 20 is removed, since the holding force of the compressed o-ring 38 is not substantial.

Figures 2, 3:
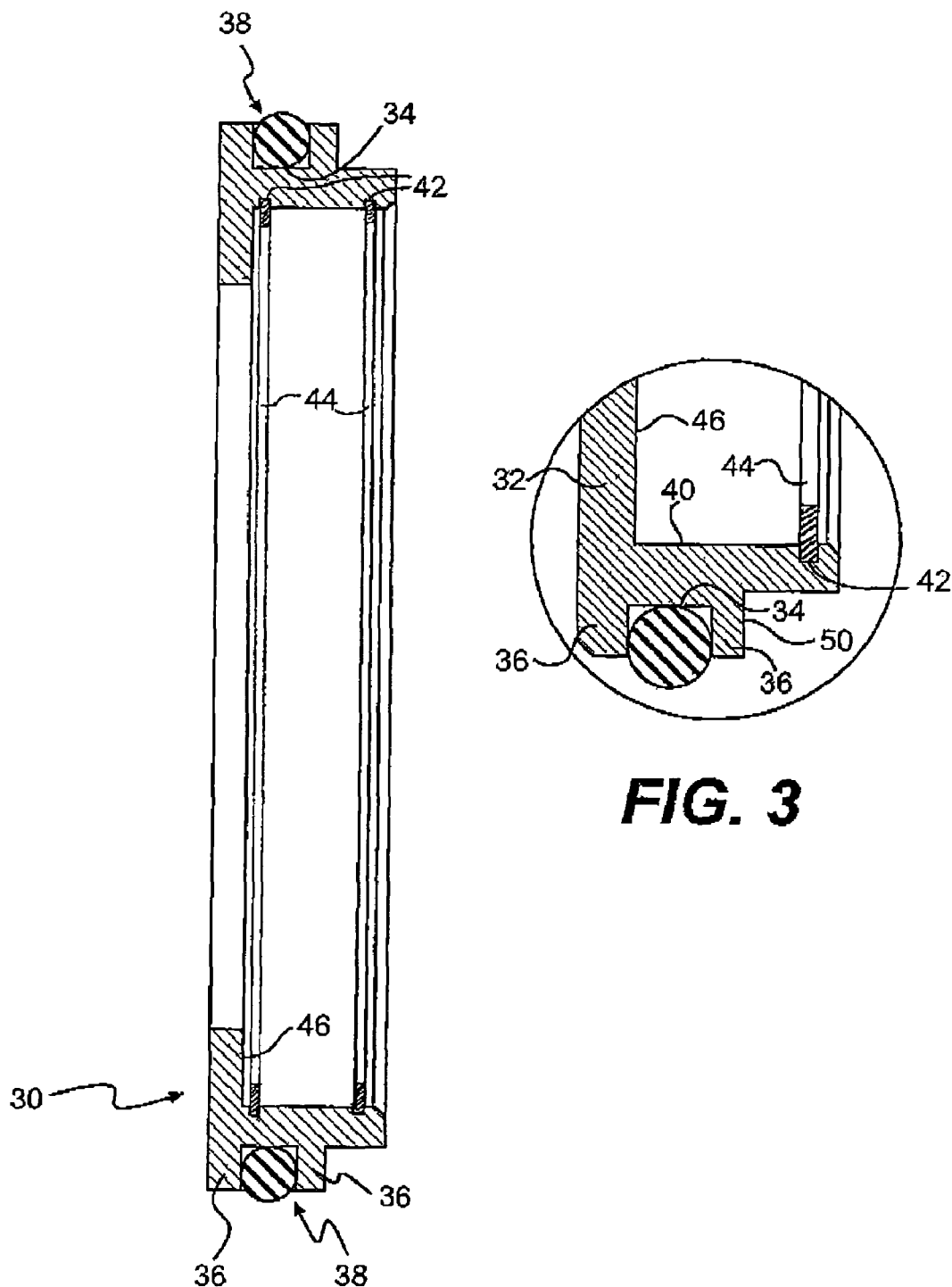
FIG. 2 is a sectional view of the racing hub seal adapter taken along section line 2—2 of FIG. 1.
FIG. 3 is a partial detail view of the racing hub seal adapter taken along detail line 3 of FIG. 2.
Figure 4:
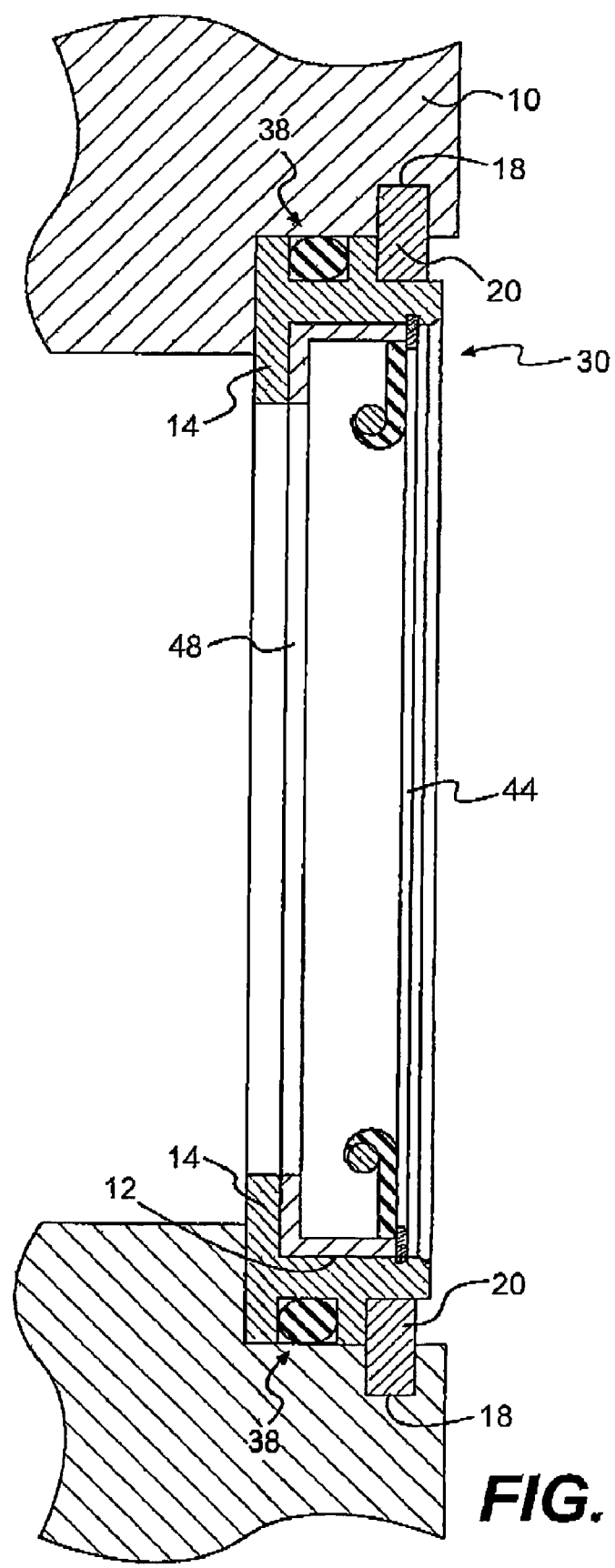
FIG. 4 is a sectional view of the racing seal hub adapter installed in the standard racing hub shown in FIG. 5.
Figure 5:
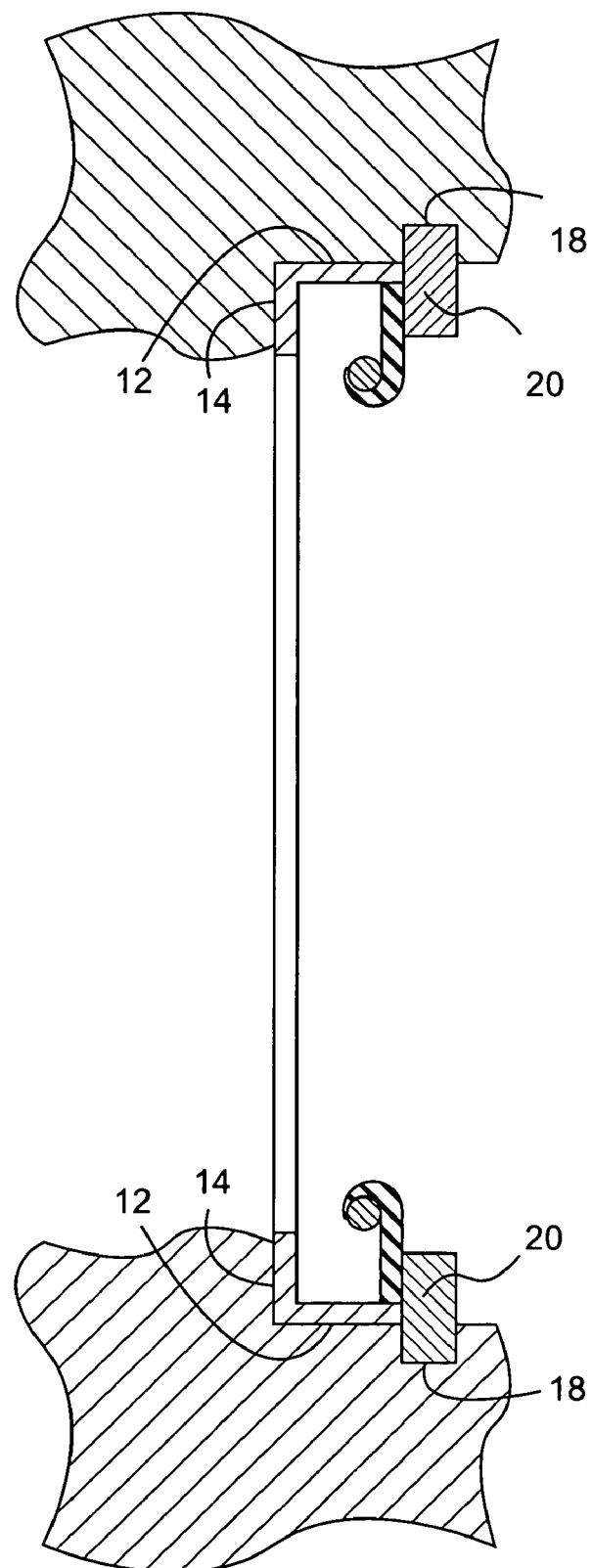
FIG. 5 (Prior Art) is a partial sectional view of a standard racing hub with a grease seal installed.

The adapter 30 further includes an internal bore 40 having a flange 46 and an internal circumferential groove 42 for receiving snap ring 44. A grease seal 48 is dimensioned to be a press fit in the internal bore 40 and is axially retained in place between the flange 46 and the snap ring 44. In an alternative embodiment, a second snap ring 44 installed in a second circumferential groove 42 can be provided to retain the grease seal, in place of the flange 46. See FIG. 2, for instance. In the preferred embodiment, this grease seal 48 is a CR23641 seal having a 3" OD, is 0.375" wide and will seal on the same 2.375" seal surface of the spindle. The o-ring 38 is preferably a 2-236 o-ring. Specific dimensions for the components are shown on FIGS. 2–3 but these dimensions can be altered as desired. The adapter also includes a flange 50 which is positioned adjacent the snap ring 20 when the adapter is installed in the hub 10, such that the walls 36 are retained between the flange 14 of the hub 10 and the snap ring 20 to retain the adapter 30 in the hub 10. The external width of the walls 36 is preferably the same 0.375" as the seal 16 so that the adapter fits in a standard hub 10 without modification of the hub 10.

The grease seal 48 can be removed from the hub 10 by removing snap ring 20 and manually removing adapter 30 from the hub 10. No tools are needed to withdraw the adapter 30 from the hub 10 once the snap ring 20 is removed. The grease seal 48 does not need to be removed from the adapter 30 unless it is worn or damaged. In this manner, the bearings can be accessed for cleaning and repacking with grease without damaging the grease seal 48. Once the bearings have been repacked and installed in the hub 10, the adapter can be reinstalled in the internal bore 12 of the hub 10 and the snap ring 20 installed in the groove 18 to retain the adapter 30 in place. The o-ring 38 can be replaced as necessary, but at a much lower cost than replacing the grease seal 48.

The bearings can be cleaned and repacked with grease after every race without necessitating the replacement of the grease seal each time. This results in a lower total cost for grease seals over the racing season. Since the adapter 30 can be removed from the hub 10 by hand without using a pry bar, the chance of damage to the hub or injury to the mechanic is also reduced. Finally, the adapter 30 can be used with a standard hub 10 and requires no modification of the hub 10. The cost of the adapter 30 is less than the season replacement cost of the grease seals 16 in the standard configuration and the adapter can be used over several seasons since it will encounter little wear. The adapter can be made of a light weight material, such as aluminum, magnesium or even plastic, since it will not encounter substantial stresses. The dimensions and configuration of the adapter 30 can be altered to work with hubs different from the hub 10 shown. The seal adapter can also be used in different applications where a reusable seal is desirable.

Various aspects of the embodiment(s) disclosed herein can be combined in different manners to create new embodiments.

What is claimed is:

1. A hub seal adapter, comprising:
   a main body, the main body having an outer diameter constructed and arranged to be removably and replaceably axially inserted into and positioned by an internal bore of a hub; and
   an internal bore positioned in the main body about an axis of the main body, the internal bore having a diameter constructed and arranged to axially receive and position a grease seal such that the grease seal is centered about an axis of the internal bore of the hub, the grease seal being removable and replaceable with respect to the internal bore of the main body, the hub seal adapter allowing removal and replacement of the grease with respect to the hub without having displace the grease seal with respect to the internal bore of the main body.

2. A hub seal adapter as in claim 1, and further comprising:
   an o-ring retaining groove positioned on an outer periphery of the main body; and
   an o-ring constructed and arranged to be seated in the o-ring retaining groove;
   wherein the o-ring takes a compression fit between the main body and the internal bore of the hub when the main body is positioned in the internal bore of the hub.

3. A hub seal adapter as in claim 2, wherein the o-ring provides a sealed connection between the main body and the hub.

4. A hub seal adapter as in claim 3, wherein the outer diameter of the main body is smaller than a diameter of the internal bore of the hub such that the main body is maintained in a radial position within the internal bore of the hub by the compression fit of the o-ring between the main body and the internal bore of the hub.

5. A hub seal adapter as in claim 4, and further comprising at least one radially extending wall positioned on the outer periphery of the main body adjacent the o-ring retaining groove to maintain an axial position of the o-ring on the main body upon at least one of: installation of the main body in the internal bore of the hubs, and removal of the main body from the internal bore of the hub.

6. A huh seal adapter as in claim 5, and comprising two radially extending walls respectively positioned on the outer periphery of the main body adjacent opposite edges of the o-ring retaining groove to maintain an axial position of the o-ring on the main body upon at least one of: installation of the main body in the internal bore of the hub, and removal of the main body from the internal bore of the hub.

7. A hub seal adapter as in claim 6, wherein the o-ring retaining groove is formed by the two radially extending walls.

8. A hub seal adapter as in claim 7, wherein the internal bore of the main body includes a retaining mechanism for axially retaining the grease seal in the internal bore of the main body.

9. A hub seal adapter as in claim 8, wherein the retaining mechanism includes a first circumferential groove on the internal bore of the main body and a first snap ring constructed and arranged to engage the first circumferential groove.

10. A hub seal adapter as in claim 9, wherein the retaining mechanism includes a second circumferential groove on the internal bore of the main body spaced axially apart from the first circumferential groove and a second snap ring constructed and arranged to engage the second circumferential groove, the grease seal being retained between the first and second snap rings.

11. A hub seal adapter as in claim 9, and further comprising a radially inwardly projecting flange positioned at one end of the internal bore of the main body to retain the grease seal between the flange and the first snap ring, the radially inwardly projecting flange having an internal diameter greater than a diameter of an axle over which the hub seal adapter is intended to fit.

12. A hub seal adapter as in claim 9, and further comprising a retaining mechanism for axially retaining the hub seal adapter in the hub, the retaining mechanism including a snap ring for engaging a groove on the internal bore of the hub.

13. A hub seal adapter as in claim 9, and further comprising the grease seal.

14. A hub seal adapter as in claim 9, and further comprising the hub.

15. A hub seal adapter as in claim 2, wherein the outer diameter of the main body is smaller than a diameter of the internal bore of the hub such that the main body is maintained in a radial position within the internal bore of the hub by the compression fit of the o-ring between the main body and the internal bore of the hub.

16. A hub seal adapter as in claim 2, and further comprising at least one radially extending wall positioned on the outer periphery of the main body adjacent the o-ring retaining groove to maintain an axial position of the o-ring on the main body upon at least one of: installation of the main body in the internal bore of the hub and removal of the main body from the internal bore of the hub.

17. A hub seal adapter as in claim 16, and comprising two radially extending walls respectively positioned on the outer periphery of the main body adjacent opposite edges of the o-ring retaining groove to maintain an axial position of the o-ring on the main body upon at least one of: installation of the main body in the internal bore of the hub, and removal of the main body from the internal bore of the hub.

18. A hub seal adapter as in claim 17, wherein the o-ring retaining groove is formed by the two radially extending walls.

19. A hub seal adapter as in claim 1, wherein the internal bore of the main body includes a retaining mechanism for axially retaining the grease seal in the internal bore of the main body.

20. A hub seal adapter as in claim 19, wherein the retaining mechanism includes a first circumferential groove on the internal bore of the main body and a first snap ring constructed and arranged to engage the first circumferential groove.

21. A hub seal adapter as in claim 20, wherein the retaining mechanism includes a second circumferential groove on the internal bore of the main body spaced axially apart from the first circumferential groove and a second snap ring constructed and arranged to engage the second circumferential groove, the grease seal being retained between the first and second snap rings.

22. A hub seal adapter as in claim 20, and further comprising a radially inwardly projecting flange positioned at one end of the internal bore of the main body to retain the grease seal between the flange and the first snap ring, the radially inwardly projecting flange having an internal diameter greater than a diameter of an axle over which the hub seal adapter is intended to fit.

23. A hub seal adapter as in claim 20, and further comprising a retaining mechanism for axially retaining the hub seal adapter in the hub, the retaining mechanism including a snap ring for engaging a groove on the internal bore of the hub.

24. A hub seal adapter as in claim 1, and further comprising a radially inwardly projecting flange positioned at one end of the internal bore of the main body to axially retain the grease seal on one side, the radially inwardly projecting flange having an internal diameter greater than a diameter of an axle over which the hub seal adapter is intended to fit.

25. A hub seal adapter as in claim 1, and further comprising a retaining mechanism for axially retaining the hub seal adapter in the hub, the retaining mechanism including a snap ring for engaging a groove on the internal bore of the hub.

26. A hub seal adapter as in claim 1, and further comprising the grease seal.

27. A hub seal adapter as in claim 1, and further comprising the hub.

28. A hub seal adapter as in claim 2, wherein the compression fit of the o-ring is capable of allowing removal of the hub seal adapter from the hub by hand.

29. A hub seal adapter, comprising:
a main body, the main body having an outer diameter constructed and arranged to be axially inserted into an internal bore of a hub;
an internal bore positioned in the main body about an axis of the main body, the internal bore having a diameter constructed and arranged to axially receive a grease seal such that the grease seal is centered about an axis of the internal bore of the hub, the grease seal being removable and replaceable with respect to the internal bore of the main body,
an o-ring retaining groove positioned on an outer periphery of the main body; and
an o-ring constructed and arranged to be seated in the o-ring retaining groove;

wherein the o-ring takes a compression fit between the main body and the internal bore of the hub when the main body is positioned in the internal bore of the hub.

30. A hub seal adapter as in claim 29, wherein the o-ring provides a sealed connection between the main body and the hub.

31. A hub seal adapter as in claim 30, wherein the outer diameter of the main body is smaller than a diameter of the internal bore of the hub such that the main body is maintained in a radial position within the internal bore of the hub by the compression fit of the o-ring between the main body and the internal bore of the hub.

32. A hub seal adapter as in claim 31, and further comprising at least one radially extending wall positioned on the outer periphery of the main body adjacent the o-ring retaining groove to maintain an axial position of the o-ring on the main body upon at least one of: installation of the main body in the internal bore of the hub, and removal of the main body from the internal bore of the hub.

33. A hub seal adapter as in claim 32, and comprising two radially extending walls respectively positioned on the outer periphery of the main body adjacent opposite edges of the a-ring retaining groove to maintain an axial position of the o-ring on the main body upon at least one of: installation of the main body in the internal bore of the hub, and removal of the main body from the internal bore of the hub.

34. A hub seal adapter as in claim 33, wherein the o-ring retaining groove is formed by the two radially extending walls.

35. A hub seal adapter as in claim 34, wherein the internal bore of the main body includes a retaining mechanism for axially retaining the grease seal in the internal bore of the main body.

36. A hub seal adapter as in claim 35, wherein the retaining mechanism includes a first circumferential groove on the internal bore of the main body and a first snap ring constructed and arranged to engage the first circumferential groove.

37. A hub seal adapter as in claim 36, wherein the retaining mechanism includes a second circumferential groove on the internal bore of the main body spaced axially apart from the first circumferential groove and a second snap ring constructed and arranged to engage the second circumferential groove, the grease seal being retained between the first and second snap rings.

38. A hub seal adapter as in claim 36, and further comprising a radially inwardly projecting flange positioned at one end of the internal bore of the main body to retain the grease seal between the flange and the first snap ring, the radially inwardly projecting flange having an internal diameter greater than a diameter of an axle over which the hub seal adapter is intended to fit.

39. A hub seal adapter as in claim 36, and further comprising a retaining mechanism for axially retaining the hub seal adapter in the hub, the retaining mechanism including a snap ring for engaging a groove on the internal bore of the hub.

40. A hub seal adapter as in claim 36, and further comprising the grease seal.

41. A hub seal adapter as in claim 36, and farther comprising the hub.

42. A hub seal adapter as in claim 29, wherein the outer diameter of the main body is smaller than a diameter of the internal bore of the hub such tat the main body is maintained in a radial position within the internal bore of the hub by the compression fit of the o-ring between the main body and the internal bore of the hub.

43. A hub seal adapter as in claim 29, and further comprising at least one radially extending wall positioned on the outer periphery of the main body adjacent the o-ring retaining groove to maintain ax axial position of the o-ring on the main body upon at least one of: installation of the main body in the internal bore of the hub, and removal of the main body from the internal bore of the hub.

44. A hub seal adapter as in claim 43, and comprising two radially extending walls respectively positioned on the outer periphery of the main body adjacent opposite edges of the o-ring retaining groove to maintain an axial position of the o-ring on the main body upon at least one of: installation of the main body in the internal bore of the hub, and removal of the main body from the internal bore of the hub.

45. A hub seal adapter as in claim 44, wherein the o-ring retaining groove is formed by the two radially extending walls.

46. A hub seal adapter as in claim 29, wherein the internal bore of the main body includes a retaking mechanism for axially retaining the grease seal in the internal bore of the main body.

47. A hub seal adapter as in claim 46, wherein the retaining mechanism includes a first circumferential groove on the internal bore of the main body and a first snap ring constructed and arranged to engage the first circumferential groove.

48. A hub seal adapter as in claim 47, wherein the retaining mechanism includes a second circumferential groove on the internal bore of the main body spaced axially apart from the first circumferential groove and a second snap ring constructed and arranged to engage the second circumferential groove, the grease seal being retained between the first and second snap rings.

49. A hub seal adapter as in claim 47, and further comprising a radially inwardly projecting flange positioned at one end of the internal bore of the main body to retain the grease seal between the flange and the first snap ring, the radially inwardly projecting flange having an internal diameter greater than a diameter of an axle over which the hub seal adapter is intended to fit.

50. A hub seal adapter as in claim 46, and further comprising a retaining mechanism for axially retaining the hub seal adapter in the hub, the retaining mechanism including a snap ring for engaging a groove on the internal bore of the hub.

51. A hub seal adapter as in claim 29, and further comprising a radially inwardly projecting flange positioned at one end of the internal bore of the main body to axially retain the grease seal on one side, the radially inwardly projecting flange having an internal diameter greater than a diameter of an axle over which the hub seal adapter is intended to fit.

52. A hub seal adapter as in claim 29, and further comprising a retaining mechanism for axially retaining the hub seal adapter in the hub, the retaining mechanism including a snap ring for engaging a groove on the internal bore of the hub.

53. A hub seal adapter as in claim 29, and further comprising the grease seal.

54. A hub seal adapter as in claim 29, and further comprising the hub.

55. A hub seal adapter as in claim 29, wherein the compression fit of the o-ring is capable of allowing removal of the hub seal adapter from the hub by hand.

56. A hub seal adapter, comprising:
a main body, the main body having an outer diameter constructed and arranged to be axially inserted into an internal bore of a hub; and
an internal bore positioned in the main body about an axis of the main body, the internal bore having a diameter constructed and arranged to axially receive a grease seal such that the grease seal is centered about an axis of the internal bore of the hub,
wherein the internal bore of the main body includes a retaining mechanism for axially retaining the grease seal in the internal bore of the main body and the retaining mechanism includes a first circumferential groove on the internal bore of the main body and a first snap ring constructed and arranged to engage the first circumferential groove.

57. A hub seal adapter as in claim 56, and further comprising:
an o-ring retaining groove positioned on an outer periphery of the main body; and
an o-ring constructed and arranged to be seated in the o-ring retaining groove;
wherein the o-ring takes a compression fit between the main body and the internal bore of the hub when the main body is positioned in the internal bore of the hub.

58. A hub seal adapter as in claim 57, wherein the o-ring provides a sealed connection between the main body and the hub.

59. A hub seal adapter as in claim 58, wherein the outer diameter of the main body is smaller than a diameter of the internal bore of the hub such that the main body is maintained in a radial position within the internal bore of the hub by the compression fit of the o-ring between the main body and the internal bore of the hub.

60. A hub seal adapter as in claim 59, and further comprising at least one radially extending wall positioned on the outer periphery of the main body adjacent the o-ring retaining groove to maintain an axial position of the o-ring on the main body upon at least one of: installation of the main body in the internal bore of the hub, and removal of the main body from the internal bore of the hub.

61. A hub seal adapter as in claim 60, and comprising two radially extending walls respectively positioned on the outer periphery of the main body adjacent opposite edges of the o-ring retaining groove to maintain an axial position of the o-ring on the main body upon at least one of: installation of the main body in the internal bore of the hub, and removal of the main body from the internal bore of the hub.

62. A hub seal adapter as in claim 61, wherein the o-ring retaining groove is formed by the two radially extending walls.

63. A hub seal adapter as in claim 62, wherein the internal bore of the main body includes a retaining mechanism for axially retaining the grease seal in the internal bore of the main body.

64. A hub seal adapter as in claim 63, wherein the retaining mechanism includes a first circumferential groove on the internal bore of the main body and a first snap ring constructed and arranged to engage the first circumferential groove.

65. A hub seal adapter as in claim 64, wherein the retaining mechanism includes a second circumferential groove on the internal bore of the main body spaced axially apart from the first circumferential groove and a second snap ring constructed and arranged to engage the second circumferential groove, the grease seal being retained between the first and second snap rings.

66. A hub seal adapter as in claim 64, and further comprising a radially inwardly projecting flange positioned at one end of the internal bore of the main body to retain the grease seal between the flange and the first snap ring, the radially inwardly projecting flange having an internal diameter greater than a diameter of an axle over which the hub seal adapter is intended to fit.

67. A hub seal adapter as in claim 64, and further comprising a retaining mechanism for axially retaining the hub seal adapter in the hub, the retaining mechanism including a snap ring for engaging a groove on the internal bore of the hub.

68. A hub seal adapter as in claim 64, and further comprising the grease seal.

69. A hub seal adapter as in claim 64, and further comprising the hub.

70. A hub seal adapter as in claim 56, wherein the outer diameter of the main body is smaller than a diameter of the internal bore of the hub such that the main body is maintained in a radial position within the internal bore of the hub by the compression fit of the o-ring between the main body and the internal bore of the hub.

71. A hub seal adapter as in claim 56, and further comprising at least one radially extending wall positioned on the outer periphery of the main body adjacent the o-ring retaining groove to maintain an axial position of the o-ring on the main body upon at least one of; installation of the main body in the internal bore of the hub, and removal of the main body from the internal bore of the hub.

72. A hub seal adapter as in claim 71, and comprising two radially extending walls respectively positioned on the outer periphery of the main body adjacent opposite edges of the o-ring retaining groove to maintain an axial position of the o-ring on the main body upon at least one of: installation of the main body in the internal bore of the hub, and removal of the main body from the internal bore of the hub.

73. A hub seal adapter as in claim 72, wherein the o-ring retaining groove is formed by the two radially extending walls.

74. A hub seal adapter as in claim 56, wherein the retaining mechanism includes a second circumferential groove on the internal bore of the main body spaced axially apart from the first circumferential groove and a second snap ring constructed and arranged to engage the second circumferential groove, the grease seal being retained between the first and second snap rings.

75. A hub seal adapter as in claim 56, and further comprising a radially inwardly projecting flange positioned at one end of the internal bore of the main body to retain the grease seal between the flange and the first snap ring, the radially inwardly projecting flange having an internal diameter greater than a diameter of an axle over which the hub seal adapter is intended to fit.

76. A hub seal adapter as in claim 56, and further comprising a retaining mechanism for axially retaining the hub seal adapter in the hub, the retaining mechanism including a snap ring for engaging a groove on the internal bore of the hub.

77. A hub seal adapter as in claim 56, and further comprising a radially inwardly projecting flange positioned at one end of the internal bore of the main body to axially retain the grease seal on one side, the radially inwardly projecting flange having an internal diameter greater than a diameter of an axle over which the hub seal adapter is intended to fit.

78. A hub seal adapter as in claim 56, and further comprising a retaining mechanism for axially retaining the hub seal adapter in the hub, the retaining mechanism including a snap ring for engaging a groove on the internal bore of the hub.

79. A hub seal adapter as in claim 56, and further comprising the grease seal.

80. A hub seal adapter as in claim 56, and further comprising the hub.

81. A hub seal adapter as in claim 56, wherein the compression fit of the o-ring is capable of allowing removal of the hub seal adapter from the hub by hand.

82. A hub seal adapter, comprising:
a main body, the main body having an outer diameter constructed and arranged to be axially inserted into an internal bore of a hub;
an internal bore positioned in the main body about an axis of the main body, the internal bore having a diameter constructed and arranged to axially receive a grease seal such that the grease seal is centered about an axis of the internal bore of the hub, the grease seal being removable and replaceable with respect to the internal bore of the main body, and
a retaining mechanism for axially retaining the hub seal adapter in the hub, the retaining mechanism including a snap ring for engaging a groove on the internal bore of the hub.

83. A hub seal adapter as in claim 82, and further comprising:
an o-ring retaining groove positioned on an outer periphery of the main body; and
an o-ring constructed and arranged to be seated in the o-ring retaining groove;
wherein the o-ring takes a compression fit between the main body and the internal bore of the hub when the main body is positioned in the internal bore of the hub.

84. A hub seal adapter as in claim 83, wherein the a-ring provides a sealed connection between the main body and the hub.

85. A hub seal adapter as in claim 84, wherein the outer diameter of the main body is smaller than a diameter of the internal bore of the hub such that the main body is maintained in a radial position within the internal bore of the hub by the compression fit of the o-ring between the main body and the internal bore of the hub.

86. A hub seal adapter as in claim 85, and further comprising at least one radially extending wall positioned on the outer periphery of the main body adjacent the o-ring retaining groove to maintain an axial position of the o-ring an the main body upon at least one of; installation of the main body in the internal bore of the hub, and removal of the main body from the internal bore of the hub.

87. A hub seal adapter as in claim 86, and comprising two radially extending walls respectively positioned on the outer periphery of the main body adjacent opposite edges of the o-ring retaining groove to maintain an axial position of the o-ring on the main body upon at least one of: installation of the main body in the internal bore of the hub, and removal of the main body from the internal bore of the hub.

88. A hub seal adapter as in claim 87, wherein the o-ring retaining groove is formed by the two radially extending walls.

89. A hub seal adapter as in claim 88, wherein the internal bore of the main body includes a retaining mechanism for axially retaining the grease seal in the internal bore of the main body.

90. A hub seal adapter as in claim 89, wherein the retaining mechanism includes a first circumferential groove on the internal bore of the main body and a first snap ring constructed and arranged to engage the first circumferential groove.

91. A hub seal adapter as in claim 90, wherein the retaining mechanism includes a second circumferential groove on the internal bore of the main body spaced axially apart from the first circumferential groove and a second snap ring constructed and arranged to engage the second circumferential groove, the grease seal being retained between the first and second snap rings.

92. A hub seal adapter as in claim 90, and further comprising a radially inwardly projecting flange positioned at one end of the internal bore of the main body to retain the grease seal between the flange and the first snap ring, the radially inwardly projecting flange having an internal diameter greater than a diameter of an axle over which the hub seal adapter is intended to fit.

93. A hub seal adapter as in claim 90, and further comprising a retaining mechanism for axially retaining the hub seal adapter in the hub, the retaining mechanism including a snap ring for engaging a groove on the internal bore of the hub.

94. A hub seal adapter as in claim 90, and further comprising the grease seal.

95. A hub seal adapter as in claim 90, and further comprising the hub.

96. A hub seal adapter as in claim 83, wherein the outer diameter of the main body is smaller than a diameter of the internal bore of the hub such that the main body is maintained in a radial position within the internal bore of the hub by the compression fit of the o-ring between the main body and the internal bore of the hub.

97. A hub seal adapter as in claim 83, and further comprising at least one radially extending wall positioned on the outer periphery of the main body adjacent the o-ring retaining groove to maintain an axial position of the o-ring on the main body upon at least one of: installation of the main body in the internal bore of the hub, and removal of the main body from the internal bore of the hub.

98. A hub seal adapter as in claim 97, and comprising two radially extending walls respectively positioned on the outer periphery of the main body adjacent opposite edges of the o-ring retaining groove to maintain an axial position of the o-ring on the main body upon at least one of: installation of the main body in the internal bore of the hub, and removal of the main body from the internal bore of the hub.

99. A hub seal adapter as in claim 98, wherein the o-ring retaining groove is formed by the two radially extending walls.

100. A hub seal adapter as in claim 82, wherein the internal bore of the main body includes a retaining mechanism for axially retaining the grease seal in the internal bore of the main body.

101. A hub seal adapter as in claim 100, wherein the retaining mechanism includes a first circumferential groove on the internal bore of the main body and a first snap ring constructed and arranged to engage the first circumferential groove.

102. A hub seal adapter as in claim 101, wherein the retaining mechanism includes a second circumferential groove on the internal bore of the main body spaced axially apart from the first circumferential groove and a second snap ring constructed and arranged to engage the second circumferential groove, the grease seal being retained between the first and second snap rings.

103. A hub seal adapter as in claim 101, and further comprising a radially inwardly projecting flange positioned at one end of the internal bore of the main body to retain the grease seal between the flange and the first snap ring, the radially inwardly projecting flange having an internal diameter greater than a diameter of an axle over which the hub seal adapter is intended to fit.

104. A hub seal adapter as in claim 101, and further comprising a retaining mechanism for axially retaining the hub seal adapter in the hub, the retaining mechanism including a snap ring for engaging a groove on the internal bore of the hub.

105. A hub seal adapter as in claim 82, and further comprising a radially inwardly projecting flange positioned at one end of the internal bore of the main body to axially retain the grease seal on one side, the radially inwardly projecting flange having an internal diameter greater than a diameter of an axle over which the hub seal adapter is intended to fit.

106. A hub seal adapter as in claim 82, and further comprising the grease seal.

107. A hub seal adapter as in claim 82, and further comprising the hub.

108. A hub seal adapter as in claim 83, wherein the compression fit of the o-ring is capable of allowing removal of the hub seal adapter from the hub by hand.

* * * * *